(12) United States Patent
Kimura

(10) Patent No.: US 7,021,609 B2
(45) Date of Patent: Apr. 4, 2006

(54) GAS SPRING

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 32 days.

(21) Appl. No.: 10/473,828

(22) PCT Filed: Apr. 5, 2002

(86) PCT No.: PCT/JP02/03469

§ 371 (c)(1),
(2), (4) Date: Oct. 28, 2003

(87) PCT Pub. No.: WO02/088570

PCT Pub. Date: Nov. 7, 2002

(65) Prior Publication Data

US 2004/0155390 A1    Aug. 12, 2004

(30) Foreign Application Priority Data

Apr. 11, 2001    (JP)    ............... 2001-112964

(51) Int. Cl.
*F16F 9/02*    (2006.01)
*F16F 9/32*    (2006.01)
*F16F 9/36*    (2006.01)

(52) U.S. Cl. .................. 267/64.11; 184/6.8; 184/6.14; 92/153; 267/64.28

(58) Field of Classification Search ............... 184/6.14, 184/6.8, 14, 18, 100, 24; 267/64.11–64.28, 267/137, 119, 130, 113; 92/168, 83, 142, 92/153, 165 R; 409/231; 408/239 R; 173/DIG. 3
See application file for complete search history.

(56) References Cited

U.S. PATENT DOCUMENTS

| 4,948,104 | A  | * | 8/1990 | Wirges | ..................... | 267/64.11 |
| 6,663,088 | B1 | * | 12/2003 | Kimura | ..................... | 267/64.28 |
| 2004/0140599 | A1 | * | 7/2004 | Kimura | ..................... | 267/64.11 |
| 2004/0155390 | A1 | * | 8/2004 | Kimura | ..................... | 267/64.11 |

FOREIGN PATENT DOCUMENTS

| EP | 1384917 A1 | * | 1/2004 |
| EP | 1384918 A1 | * | 1/2004 |
| JP | 2000-5907  |   | 1/2000 |
| JP | 2001-87910 |   | 4/2001 |
| JP | 2001-246507 |  | 9/2001 |
| JP | 2001-280390 |  | 10/2001 |
| WO | WO 02/084141 A1 | * | 10/2002 |

OTHER PUBLICATIONS

STIC provided translations for JP2000-5907, JP2001-87910, JP64-35229,JP1-87367, JP53-57146, JP2001-246507, JP2001-280390.*

(Continued)

*Primary Examiner*—Douglas C. Butler
(74) *Attorney, Agent, or Firm*—Jordan and Hamburg LLP

(57) ABSTRACT

A gas spring has a cylinder body, a rod member internally slidably fitted in the cylinder body, and a gas chamber which is formed inside the cylinder body and filled with compressed gas. The seal members for sealing between the cylinder body and the rod member are disposed at both sides of the gas chamber, while ring members for partitioning the gas chamber are disposed at the end portions of the gas chamber close to the seal members, and accordingly, annular grease chambers for grease between the seal member and the ring member are formed, and it is possible to prevent grease shortage by the grease in the grease chambers.

3 Claims, 3 Drawing Sheets

OTHER PUBLICATIONS

Microfilm of the specification and drawings annexed to the request of Japanese Utility Model Application No. 92791/1973 (Laid-open No. 36992/1975) (Hiroaki Hideyoshi) Apr. 17, 1975 (Family: none).

Mircrofilm of the specification and drawings annexed to the request of Japanese Utility Model Application No. 12992/1987 (Laid-Open No. 35299/1989) (Atsugi Jidosha Buhin Kabushiki Kaisha), Mar. 3, 1989, (Family: none).

Microfilm of the specification and drawings annexed to the request of Japanese Utility Model Application No. 181916/1987 (Laid-Open No. 87367/1989) (Mitsubishi Heavy Industries, Ltd.), Jun. 9, 1988, (Family: none).

Microfilm of the specification and drawings annexed to the request of Japanese Utility Model Application No. 139618/1976 (Laid-open No. 57146/1978) (Toyota Motor Co., Ltd.), May 16, 1978, (Family: none).

* cited by examiner

GAS SPRING

BACKGROUND

The present invention relates to a gas spring, and more particularly, to a gas spring wherein a grease chamber is formed between a seal member and a ring member by mounting the ring member close to the seal member for sealing compressed gas.

Conventionally, a gas spring used in various types of machines generally comprises a cylinder body, a rod member internally slidably fitted in the cylinder body, and a gas chamber which is formed inside the cylinder body and filled with compressed gas (i.e. nitrogen gas). The rod member is forwardly driven by the compressed gas in the gas chamber.

The gas chamber is filled with compressed gas of high pressure (for example, 7 to 10 MPa) for powerful and forward driving of the rod member. In order to maintain the state of high pressure to prevent lowering of the forward driving force, a seal member is mounted between the cylinder body and the rod member, and thus, the compressed gas is sealed and prevented from leaking.

In that case, since the rod member slides against the seal member, friction is generated between the rod member and the seal member. To suppress the wear of the seal member due to friction, grease is usually employed as a lubricant. In the case of a relatively large gas spring, a grease groove is formed by machining the inner periphery of the cylinder body, and the groove is filled with grease. However, in the case of a small-sized gas spring, it is difficult to form such a groove by machining, and therefore grease is coated on the rod member.

In the small-sized gas spring, since grease is applied only to the rod member, the grease is gradually used up as the gas spring is used. As a result, the seal member excessively wears and the surface of the rod member becomes liable to be scratched as well, causing the compressed gas to leak from between the rod member and the seal member, which results in shortening the life of the gas spring.

The object of the present invention is to provide a configuration that enables easy forming of a grease chamber for grease, and to prolong the life of the gas spring.

SUMMARY

The present invention provides a gas spring comprising a cylinder body, a rod member internally slidably fitted in the cylinder body, a gas chamber formed inside the cylinder body and filled with compressed gas, a seal member for sealing between the cylinder body and the rod member at least at one end of the gas chamber, a ring member for partitioning the gas chamber at an end portion of the gas chamber near the seal member, and an annular grease chamber which is formed between the seal member and the ring member and filled with grease.

In assembly of the gas spring, before fitting the rod member in the cylinder body, the ring member is press fit in the end portion of the gas chamber near the seal member, forming a grease chamber between the seal member and the ring member, and the rod member is internally fitted in the cylinder body after filling the grease chamber with grease. When the gas spring is in a usable state, the ring member is act on by the pressure of compressed gas to the seal member side, and thereby, there is no fear of grease leakage from the grease chamber. Since a grease chamber can be easily formed between the seal member and the ring member and filled with grease, and the grease is replenished from the grease chamber when the gas spring is in the usable state, the grease between the rod member and the seal member is not used up, thereby prolonging the life of the gas spring.

It is also preferable to dispose the rod member in a state of penetrating the cylinder body and to arrange the seal member, the ring member and the grease chamber at both ends of the gas chamber. In the gas spring configured so that the rod member is penetrating the cylinder body, the rod member slides on both end sides of the cylinder body, and therefore, it is necessary to dispose seal members for preventing compressed gas leakage respectively at both ends of the gas chamber. By disposing two ring members at both end portions of the gas chamber, it is possible to form a respective grease chamber between seal members and ring members respectively, thereby enabling grease to be stored.

It is also preferable that the ring member is externally mounted on the rod member slidably, and the outer periphery of the ring member is fitted in an annular groove in the inner periphery of the cylinder body. In this case, the movement of the ring member toward an axial center is stopped, and there is almost no fear of grease leakage from the grease chamber. In case the ring member is formed in a continuous annular configuration by using a synthetic resin material, when the ring member is press fit in the annular groove, it can be relatively easily fitted in the annular groove by elastically deforming the ring member. Also, in case the ring member is formed in such manner that the diameter can be reduced via one parted portion in the periphery, when the ring member is press fit in the annular groove, it can be relatively easily fitted in the annular groove by reducing the diameter of the ring member.

DETAILED DESCRIPTION

A preferred embodiment of the present invention is described hereinafter.

In the embodiment, the present invention is applied to a tool fixing device for fixing a tool to a tip portion of a spindle of a machine tool in a detachable fashion.

Figure 1:
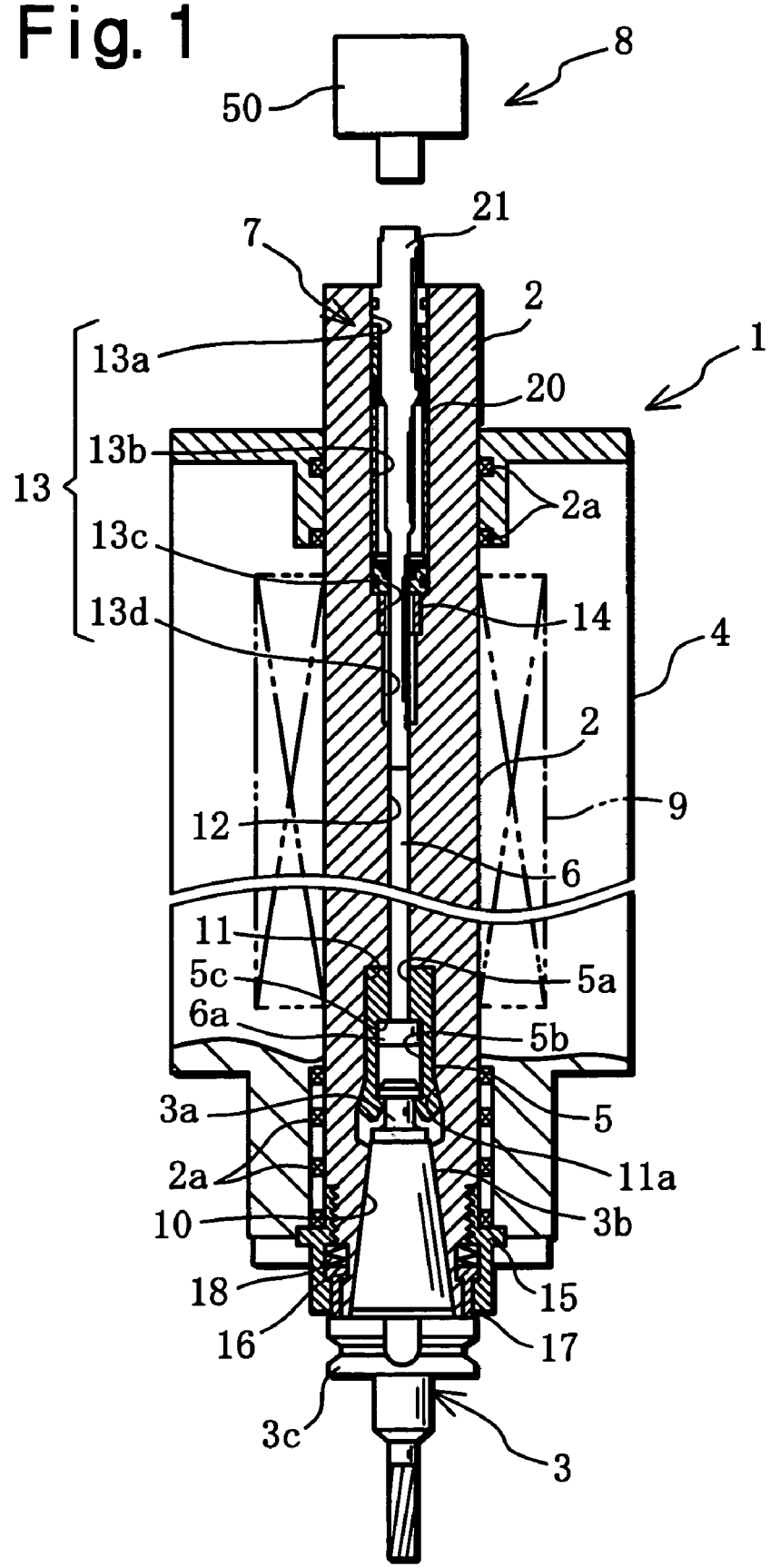
FIG. 1 is a side elevation cross-sectional view of a tool fixing device and a gas spring of a preferred embodiment of the present invention.

As shown in FIG. 1, a spindle 2 of the machine tool is rotatably supported via a plurality of bearings 2a, and is provided with a tool retainer 10 tapered to increase in diameter toward a tip side at a tip portion thereof.

The tool fixing device 1 comprises component parts such as a frame 4 for supporting the spindle 2, a collet 5 for engaging detachably with a fitting portion 3a of a base end of a tool 3, a draw bar 6 connected to the collet 5, a gas spring 7 (proposed by the present invention), connected to the draw bar 6, which activates the draw bar 6 to drive the tool 3 toward a base end side (tool fixing side, that is, upper side of FIG. 1), a releasing mechanism 8 is capable of driving the draw bar 6 toward the tip side (tool releasing side, that is, lower side of FIG. 1) against the activating force of the gas spring 7, and a coil 9 for rotationally driving the spindle 2.

Figure 2:
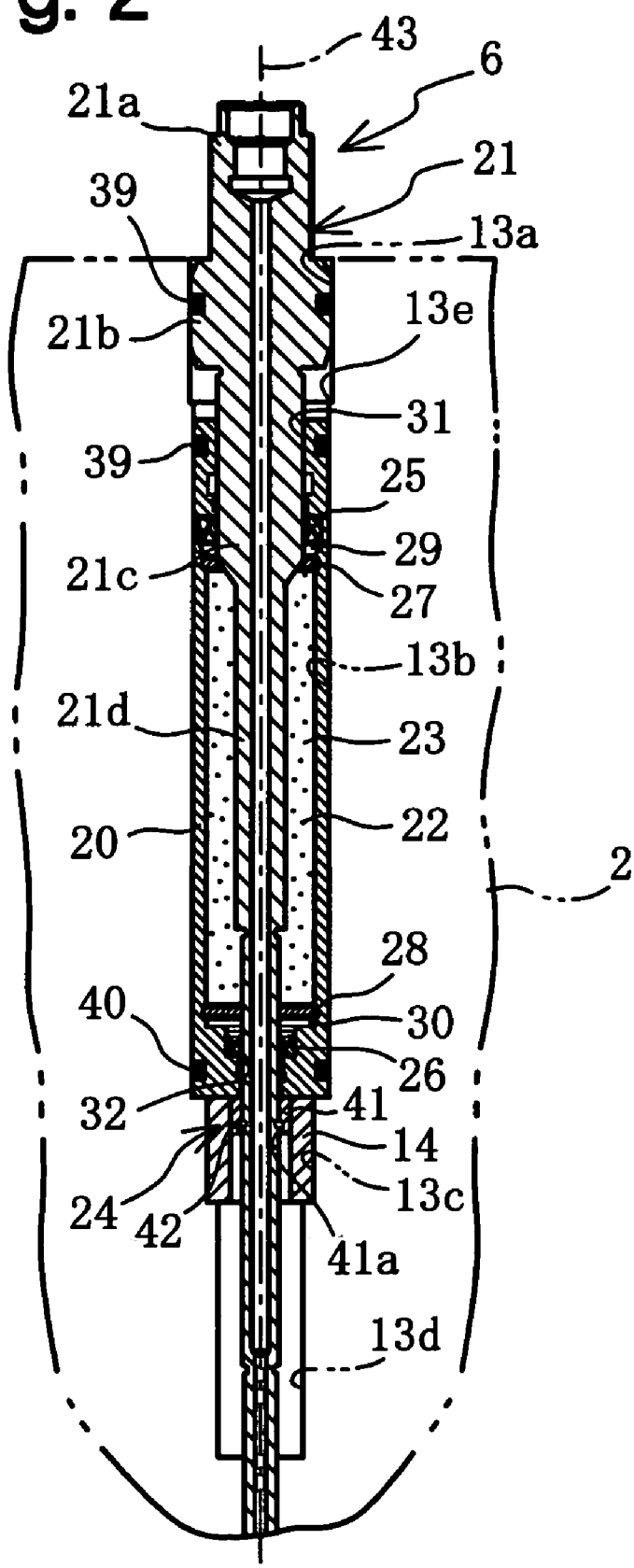
FIG. 2 is a side elevation cross-sectional view of a gas spring.

The spindle 2 includes a tool retainer 10, a housing hole 11 for housing the collet 5, an insert hole 12 in which the draw bar 6 is inserted, and a housing hole 13 for housing the gas spring 7, which are formed in series from the tip portion to the base end side. The tip portion of the housing hole 11 is provided with a taper hole 11a which elastically deforms a divided part of the collet 5 in the direction of decreasing the diameter. As shown in FIG. 1 and FIG. 2, the housing hole 13 includes a rod sliding aperture 13a in which a large-diameter portion 21b of a rod member 21 is internally slidably fitted, a cylinder housing hole 13b, a little smaller in diameter than the rod sliding aperture 13a, in which a cylinder body 20 of the gas spring 7 is housed, a recess hole 13c connected with the cylinder housing hole 13b, and a cylindrical hole 13d, smaller in diameter than the recess hole 13c, which are arranged in series from the base end side (top end side). A cylinder member 14 is fitted in the recess hole 13c, and at the end at the tip side of the cylinder body 20 abuts the end at the base end side of the cylindrical member 14.

On the tip portion of the spindle 2 fixed is a sleeve 15 with its base end portion externally threaded thereon. A plurality of apertures 16 are formed between the tip portion of the sleeve 15 and the spindle 2, and in each aperture 16 internally slidably fitted is the base end portion of a push member 17 with its tip portion projected toward the tip side of the spindle 2, and each push member 17 is activated toward the tip side by a plurality of plate springs 18 fitted in the apertures 16.

The tool 3 includes the fitting portion 3a and taper shaft portion 3b, and large-diameter disk portion 3c disposed at the tip side of the taper shaft 3b.

The collet 5 has a divided part having elasticity at its end portion divided into 3 or 4 parts, having shaft aperture 5a in which the draw bar 6 is inserted and large-diameter aperture 5b which is disposed at the tip side of the shaft aperture 5a and larger in diameter than the shaft aperture 5a, and a stop portion 6a fixed on the tip portion of the draw bar 6 is internally fitted in the large-diameter aperture 5b.

When the draw bar 6 moves to the tool fixing side, the stop portion 6a is stopped by step portion 5c at the boundary between the shaft aperture 5a and the large-diameter aperture 5b, and the collet 5 also moves to the base end side (to the top side). Then, the divided part at the tip side of the collet 5 while being closed by the taper hole 11a moves into an interior of the housing aperture 11 and engages with the fitting portion 3a of the tool 3. After that, the fitting portion 3a is pulled toward the base end side, and the tool 3 is fixed with its taper shaft portion 3b abutted on the tool retainer 10.

When the taper shaft 3b is fixed, the disk portion 3c of the tool 3 is biased toward the tip side by the push member 17 biased by the plate spring 18. When the draw bar 6 is moved to the releasing side, the stopping of the stop portion 6a on the shoulder 5c is released, and the tool 3 is pushed to the tip side by the push member 17 to become released. Further, since the divided part having elasticity at the tip side of the collet 5 also opens and moves to the tip side, the tool 3 is released as the fitting portion 3a of the tool 3 is released from the collet 5.

That is, the gas spring 7 activates the draw bar 6 toward the tool fixing side via the fitting shaft fixed to the base end portion, and thereby, the draw bar 6 is driven toward the tool fixing position from the releasing position, and also, the draw bar 6 is held in the tool fixing position, and the tool 3 can be fixed in the tool retainer 10. The releasing mechanism 8, as shown in FIG. 1, has a hydraulic cylinder 50 which is controlled by a control unit including an oil pressure source. The hydraulic cylinder 50 serves to drive the rod member 21 of the gas spring 7 from the advancing position to the retracting position, thereby driving the draw bar 6 connected to the rod member 21 toward the releasing side.

Figure 3:
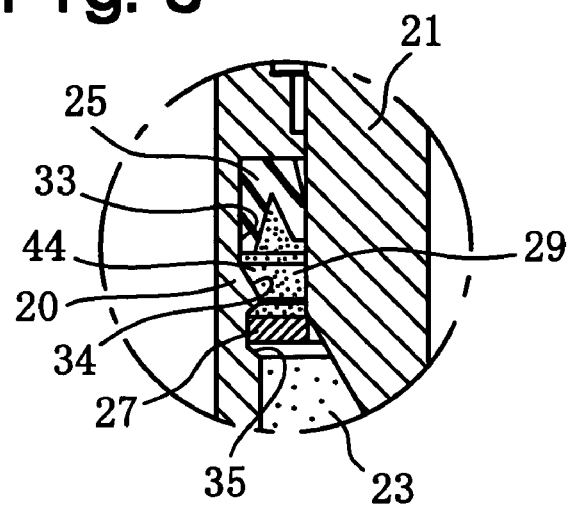
FIG. 3 is an enlarged side elevation cross-sectional view of a portion of a grease chamber (upper end side of gas chamber).
Figure 4:
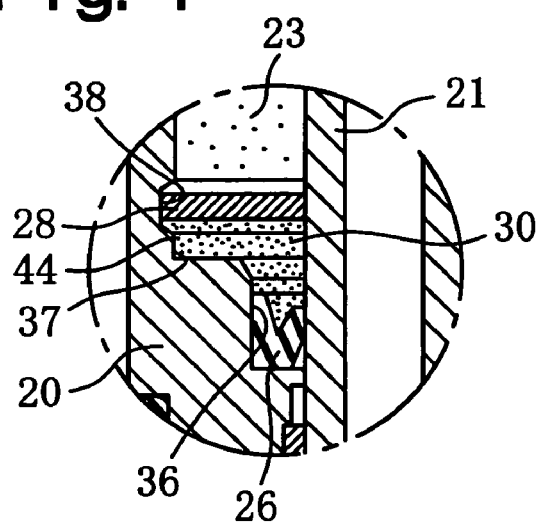
FIG. 4 is an enlarged side elevation cross-sectional view of a portion of a grease chamber (lower end side of gas chamber).

Next, the gas spring 7 will be described hereinafter. As shown in FIG. 2, FIG. 3 and FIG. 4, the gas spring 7 comprises component parts such as cylinder body 20 internally fitted in the spindle 2, a rod member 21 internally slidably fitted in the cylinder body 20 and penetrating the cylinder body 20, a gas chamber 23 formed inside the cylinder body 20 and filled with compressed gas 22, a stop mechanism 24 which restricts advancing operation from exceeding a predetermined stroke of the rod member 21 by the compressed gas 22, two seal members 25, 26 for sealing between the cylinder body 20 and the rod member 21 at both sides of the gas chamber 23, two ring members 27, 28 for partitioning the gas chamber 23 at end portions of the gas chamber 23 near the seal members 25, 26, and two annular grease chambers 29, 30 formed respectively between the seal members 25, 26 and ring members 27, 28 and filled with grease 44.

The upper end and the lower end of the cylinder body 20 are respectively provided with rod insert apertures 31, 32 in which the rod member 21 is internally slidably fitted, and inside the cylinder body 20 formed is the gas chamber 23, and the gas chamber 23 is filled with compressed gas (such as nitrogen gas) of high pressure (7 to 10 MPa). As shown in FIG. 3, at the upper end of the gas chamber 23, an annular seal mounting groove 33 for the seal member 25 is formed in an inner periphery of the cylinder body 20, and there is provided a taper groove 34 communicating with the lower end of the seal mounting groove 33 and decreasing in diameter toward the lower side and also provided is an annular groove 35 communicating with the lower end of the taper groove 34 and being larger in diameter than the lower end of the taper groove 34. As shown in FIG. 4, at the lower end of the gas chamber 23, an annular seal mounting groove 36 for the seal member 26 is also formed in the inner periphery of the cylinder body 20, and there is provided an annular groove 37 communicating with the upper end of the seal mounting groove 36 and further provided is an annular groove 38 which is larger in diameter than the annular groove 37. Seal members 39, 40 are mounted between the cylinder body 20 and the cylinder housing hole 13b.

The rod member 21 comprises a connection portion 21a to be connected to the hydraulic cylinder 50 of the releasing mechanism 8, a large-diameter portion 21b internally slidably fitted in the rod sliding aperture 13a, a mid-diameter portion 21c internally slidably fitted in the rod insert aperture 31, and a rod portion 21d internally slidably fitted in the rod insert aperture 32 and connected to the draw bar 6 at the lower end thereof, which are integrally formed in series from the top side. When the rod member 21 is moved downward by the releasing mechanism 8, the large-diameter portion 21b is moved to reach the lower end of the rod sliding aperture 13a, while the large-diameter portion 21b is stopped by a shoulder 13e at a boundary between the rod sliding aperture 13a and the cylinder housing hole 13b, thereby restricting the further backward (downward) movement of the rod member 21.

The stop mechanism 24 includes annular collar 41 internally fitted in the cylindrical member 15, and a stop ring 42 externally fitted on the middle of the rod portion 21d. Annular groove 41a is formed in the inner periphery of the lower half of the collar 41, and when the rod member 21 advances more than the predetermined stroke, the stop ring 42 engages with the annular groove 41a of the collar 41 to stop the upward advance of the rod member 21.

Next, the seal member 25, 26, ring member 27, 28, and grease chamber 29, 30 are described. As shown in FIG. 2 and FIG. 3, at the upper end side of the gas chamber 23, the seal member 25 is mounted in the seal mounting groove 33. When the rod member 21 is not internally fitted in the cylinder body 20, the ring member 27 is press fit from under into annular groove 35. The ring member 27 is formed in a continuous annular form from a synthetic resin material, and when press-fitted in the annular groove 35, the outer periphery of the ring member 27 engages with the annular groove 35, thereby stopping the movement in the direction of axial center 43. Accordingly, taper groove 34 is partitioned by the ring member 27 from the gas chamber 29, while the grease chamber 29 is formed by the seal member 25, ring member 27, and taper groove 34.

As shown in FIG. 2 and FIG. 4, also at the lower end side of the gas chamber 23, the annular seal member 26 is mounted in the seal mounting groove 36. When the rod member 21 is not internally fitted in the cylinder body 20, the ring member 28 is press fit from above into annular groove 38. The ring member 28 is formed in a continuous annular form from a synthetic resin material, and when press-fitted in the annular groove 38, the outer periphery of the ring member 28 engages with the annular groove 38, thereby stopping the movement in the direction of axial center 43. Accordingly, the annular groove 37 is partitioned by the ring member 28 from the gas chamber 23, while the grease chamber 30 is formed by the seal member 26, ring member 28, and annular groove 37.

After grease 44 is filled into the grease chamber 29, 30, the rod member 21 is internally fitted in the cylinder body 20. Thus the ring member 27, 28 is in a state of being externally slidably fitted on the rod member 21.

Next, the operation of the gas spring 7 is described.

First, in assembly of the gas spring 7, before fitting the rod member 21 in the cylinder body 20, the ring members 27, 28 are respectively fitted in the annular grooves 35, 38 respectively. In this case, since each of the ring members 27, 28 is made of synthetic resin material, the ring member 27, 28 can be relatively easily mounted in the annular groove 35, 38. After mounted in the annular grooves 35, 38, the outer peripheries of the ring members 27, 28 engage with the annular grooves 35, 38, thereby respectively stopping the movement of the ring members 27, 28 in the direction of axial center 43.

With the ring member 27, 28 fitted in the annular groove 35, 38, the taper groove 34 and annular groove 37 are partitioned respectively by the ring member 27, 28 from the gas chamber 23, thereby forming the grease chamber 29, 30. After grease 44 is filled into the grease chambers 29, 30, the rod member 21 is fitted into the cylinder body 20, and the gas chamber 23 is filled with compressed gas 22. The compressed gas 22 biases the rod member 21 upward, then the rod member 21 advances upward, but the upward movement is restricted by the stop mechanism 24, preventing it from exceeding the predetermined stroke of the rod member.

When the gas spring 7 is in a usable state, the grease 44 as a lubricant is supplied between the rod member 21 and seal member 25, 26 from the grease chamber 29, 30 according to the advancing and retracting operation of the rod member 21.

According to the gas spring 7 described above, the annular grooves 35, 38 are formed in the inner periphery of cylinder body 20, and as the ring members 27, 28 are press fit in the annular grooves 35, 38 in assembly of the gas spring 7, the grease chamber 29, 30 can be easily formed between the seal member 25, 26 and the ring member 27, 28. Accordingly, since the grease 44 is filled into the grease chamber 29, 30, and the grease 44 is supplied steadily from the grease chamber 29, 30 while the gas spring 7 is used, and there will be no shortage of grease 44 between the rod member 21 and the seal member 25, 26, thereby prolonging the life of the gas spring 7. Also, the ring members 27, 28 are activated by the compressed gas 22 toward the seal members 25, 26 respectively. Further, the outer periphery of the ring member 27, 28 engages with the annular groove 35, 38, thereby stopping the movement of the ring member 27, 28 in the direction of axial center 43. As a result, there is almost no leakage of the grease 44 from the grease chamber 29, 30.

Next, modifications applicable to the above preferred embodiment will be described in the following.

1) It is possible to apply the present invention to a gas spring 7 wherein the rod member 21 does not penetrate the cylinder body 20 but advances from one end of the cylinder body 20. In this case, the seal member, ring member, and grease chamber are disposed only at one end portion of the advance side of the rod member 21, of the gas chamber 23.

Figure 5:
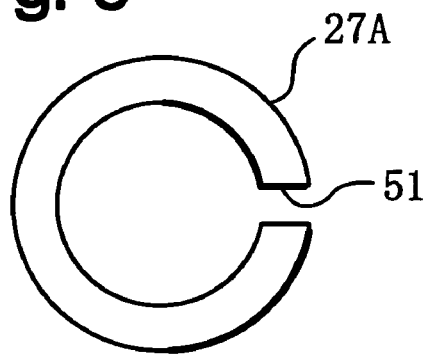
FIG. 5 is a plan view of a ring member of an upper end side of the gas chamber.
Figure 6:
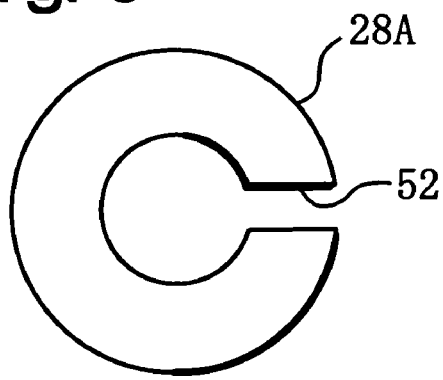
FIG. 6 is a plan view of a ring member of lower end side of the gas chamber.

2) As shown in FIG. 5 and FIG. 6, the ring members 27A, 28A can be decreased in diameter via divided parts 51, 52 at one position in the periphery. For example, in case the ring member 27A, 28A is made of metallic material, when the ring members 27A, 28A are press fit in the annular grooves 35, 38, the ring members 27A, 28A decrease in diameter via the divided parts 51, 52 and can be easily mounted in the annular grooves 35, 38. After mounted in the annular grooves 35, 38, the ring members 27A, 28A again increase in diameter, then the outer peripheral portions of the ring members 27A, 28A respectively engage with the annular grooves 35, 38.

What is claimed is:

1. A gas spring comprising:
   a cylinder body;
   a rod member internally slidably fitted in said cylinder body;
   a gas chamber formed inside said cylinder body and filled with compressed gas;
   a seal member for sealing between said cylinder body and said rod member at least one end of said gas chamber;
   a ring member for partitioning said gas chamber at an end portion of said gas chamber, said end portion being close to said seal member;
   an annular grease chamber being defined between said seal member and said ring member and filled with grease;
   said ring member being externally slidably fitted on said rod member, and an outer periphery of said ring member being fitted in an annular groove in an inner periphery of said cylinder body;
   said rod member being disposed in a state of penetrating said cylinder body; and
   said gas chamber having ends, each of said ends including a seal member, a ring chamber and a grease chamber.

2. A gas spring comprising:

a cylinder body;

a rod member internally slidably fitted in said cylinder body;

a gas chamber formed inside said cylinder body and filled with compressed gas;

a seal member for sealing between said cylinder body and said rod member at least at one end of said gas chamber;

a ring member for partitioning said gas chamber at an end portion of said gas chamber, said end portion being close to said seal member;

an annular grease chamber being defined between said seal member and said ring member and filled with grease;

said ring member being externally slidably fitted on said rod member, and an outer periphery of said ring member being fitted in an annular groove in an inner periphery of said cylinder body;

said ring member being made of synthetic resin material and configured in a continuous annular form;

said rod member being disposed in a state of penetrating said cylinder body; and said gas chamber having ends, each of said ends including a seal member, a ring chamber and a grease chamber.

3. A gas spring comprising:

a cylinder body;

a rod member internally slidably fitted in said cylinder body;

a gas chamber formed inside said cylinder body and filled with compressed gas;

a seal member for sealing between said cylinder body and said rod member at least at one end of said gas chamber;

a ring member for partitioning said gas chamber at an end portion of said gas chamber, said end portion being close to said seal member;

an annular grease chamber being defined between said seal member and said ring member and filled with grease;

said ring member being externally slidably fitted on said rod member, and an outer periphery of said ring member being fitted in an annular groove in an inner periphery of said cylinder body;

said ring member being configured so that the ring member is able to decrease in diameter via one divided portion in a periphery thereof;

said rod member being disposed in a state of penetrating said cylinder body, and said gas chamber having ends, each of said ends including one seal member, one ring chamber and one grease chamber.

* * * * *